US007082155B1

(12) United States Patent
Ogami

(10) Patent No.: US 7,082,155 B1
(45) Date of Patent: Jul. 25, 2006

(54) RECEPTION LEVEL MEASURING SYSTEM

(75) Inventor: Tadashi Ogami, Tokyo (JP)

(73) Assignee: NEC Corporation, Tokyo (JP)

( * ) Notice: Subject to any disclaimer, the term of this patent is extended or adjusted under 35 U.S.C. 154(b) by 899 days.

(21) Appl. No.: 10/049,460

(22) PCT Filed: Aug. 11, 2000

(86) PCT No.: PCT/JP00/05398

§ 371 (c)(1),
(2), (4) Date: Feb. 13, 2002

(87) PCT Pub. No.: WO01/13547

PCT Pub. Date: Feb. 22, 2001

(30) Foreign Application Priority Data

Aug. 13, 1999 (JP) ................................. 11-229060

(51) Int. Cl.
H04B 1/707 (2006.01)
(52) U.S. Cl. ...................... 375/147; 375/325; 375/349; 342/357.05; 342/362; 342/418; 455/226.2
(58) Field of Classification Search ................ 375/130, 375/147–148, 349, 322, 324–325, 340; 342/357.05, 342/362, 417–418; 455/226.2
See application file for complete search history.

(56) References Cited

U.S. PATENT DOCUMENTS 6,011,787 A * 1/2000 Nakano et al. ............. 370/335

6,351,504 B1 * 2/2002 Igarashi et al. ............. 375/349

FOREIGN PATENT DOCUMENTS

| JP | 6-13956 | 1/1994 |
| JP | 10-107732 | 4/1998 |
| JP | 11-112417 | 4/1999 |
| JP | 11-186990 | 7/1999 |
| WO | WO 99/031835 | 6/1999 |

* cited by examiner

Primary Examiner—Khai Tran
Assistant Examiner—Edith Chang
(74) Attorney, Agent, or Firm—Foley & Lardner LLP

(57) ABSTRACT

A reception level measuring system in which a base station in a code division multiple access (CDMA) mobile communication system measures a reception level of a signal from a mobile station. The reception level measuring system has an approximate-line estimating device, a phase-rotation estimating device; a Doppler-frequency estimating device and a reception signal power estimating device. The approximate-line estimating device provides an approximate line by linearly approximating signal amplitudes of a demodulated data stream in I- and Q-channels from a reception signal, in a time interval which is set in accordance with an estimated Doppler frequency. The phase-rotation estimating device estimates an amount of phase rotation based on a gradient of the approximated line. The Doppler-frequency estimating device estimates the estimated Doppler frequency based on the amount of phase rotation; and the reception signal power estimating device estimates a reception signal power based on said approximate line.

5 Claims, 5 Drawing Sheets

RECEPTION LEVEL MEASURING SYSTEM

TECHNICAL FIELD

The present invention relates to a reception level measuring system and, more particularly, to a reception level measuring system in which a base station in a code division multiple access (CDMA) mobile communication system measures the reception level of a signal from a mobile station.

BACKGROUND ART

In a CDMA mobile communication system, a mobile station shares the same frequency band, and spreads spectra of base band signals in I- and Q-channels by using specific spread codes which are assigned in advance. A base station inversely spreads and extracts the base band signals of the I- and Q-channels by using the specific spread signals which are assigned in advance to the mobile stations. The above-mentioned code division multiple access requires the same reception level of the signals which are received by the base station from the mobile stations so as to enable communication characteristics of the mobile station to be at the same level. Hence, the base station measures the reception levels and notifies the mobile station of the measured reception levels, and the mobile station control a transmission power in accordance with the notification from the base station.

Hereinbelow, a conventional reception level measuring system will be described with reference to FIG. 5. FIG. 5 is a block diagram showing the conventional reception level measuring system. The conventional reception level measuring system comprises a reception demodulating unit 101 for demodulating a reception signal received by an antenna and outputting a demodulated data stream, and a level measuring unit 102 for obtaining an average of the signal level of the demodulated data stream.

The reception demodulating unit 101 removes a carrier component and a signal component of a spread band from the reception signals which are received by the antenna from mobile station. Next, the reception demodulating unit 101 inversely spreads the signals by using spread signals which are assigned in advance to the mobile station. As a result, the demodulated data stream of the I- and Q-channels from the mobile station is outputted from the reception demodulating unit 101.

The level measuring unit 102 obtains the average signal level of the demodulated data stream (or well-known signals included in the demodulated data stream) at all sampling points for one time slot. The average is outputted as a reception level measured-value from the level measuring unit 102.

In general, the movement of the mobile station changes (fades) the reception level. In this case, the reception level varies due to the Doppler effect depending on the moving speed. A fluctuating frequency (referred to as a Doppler frequency) is increased as the moving speed of the mobile station becomes higher.

However, in the conventional reception level measuring system, since the reception level is always measured at all the sampling points for one time slot and the average is set to be the reception level, irrespective of the Doppler frequency, the reception level measured-value is smaller than the actual value when the increase in Doppler frequency causes a large variation in phase, resulting in a measurement error.

It is an object of the present invention to provide a reception level measuring system in which the reception level can be measured with high accuracy even if the increase in Doppler frequency causes a large variation in phase.

DISCLOSURE OF INVENTION

According to the present invention, there is provided a reception level measuring system in which a base station in a code division multiple access (CDMA) mobile communication system measures the reception level of a signal from a mobile station, comprising means for approximating signal amplitudes of a demodulated data stream of a reception signal by a line or a curve and for measuring the reception level based on the approximate line or the approximate curve.

Furthermore, according to the present invention, there is provided a reception level measuring system in which a base station in a code division multiple access (CDMA) mobile communication system measures a reception level of a signal from a mobile station, comprising approximate-line estimating means for linearly approximating signal amplitudes of a demodulated data stream in I- and Q-channels from a reception signal in a time interval which is set in accordance with an estimated Doppler frequency, phase-rotation estimating means for estimating the amount of phase rotation based on a gradient of the approximate line, Doppler-frequency estimating means for estimating the estimated Doppler frequency based on the amount of phase rotation, and reception signal power estimating means for estimating a reception signal power based on the approximate line, The reception level measuring system further comprises data delaying means for delaying the demodulated data stream by a time necessary for the approximate line estimating process by the approximate-line estimating means, and noise-power estimating means for determining the difference between the approximate line and the demodulated data stream delayed by the data delaying means as a noise component and for estimating a noise power. Furthermore, the reception level measuring system further comprises averaging means for subtracting the estimated noise power estimated by the noise-power estimating means from the estimated reception signal power from the reception signal power estimating means, averaging the resultant values, and outputting the average as a reception level measured-value.

According to the present invention, in addition, there is provided a reception level measuring system in which a base station in a code division multiple access (CDMA) mobile communication system measures a reception level of a signal from a mobile station, comprising approximate-curve estimating means for nonlinearly approximating signal amplitudes of a demodulated data stream in I- and Q-channels from a reception signal, phase-rotation estimating means for estimating the amount of phase rotation based on a differential coefficient of the approximate curve, Doppler-frequency estimating means for estimating an estimated Doppler frequency based on the amount of phase rotation, reception signal power estimating means for estimating a reception signal power based on the approximate curve, data delaying means for delaying the demodulated data stream by a time necessary for the approximate curve estimating process by the approximate-curve estimating means, noise-power estimating means for determining that a noise component is the difference between the approximate curve and the demodulated data stream delayed by the data delaying means and for estimating a noise power, and averaging means for subtracting the estimated noise power from the noise-power estimating means from the reception signal power estimated value which is estimated by the reception signal power estimating means, averaging the resultant values, and outputting the average as a reception level measured-value. The approximate-curve estimating means approximates the signal amplitudes of the demodulated data stream by a curve represented by a polynomial whose order is set in accordance with the estimated Doppler frequency.

BEST MODE FOR CARRYING OUT THE INVENTION

Figure 1:
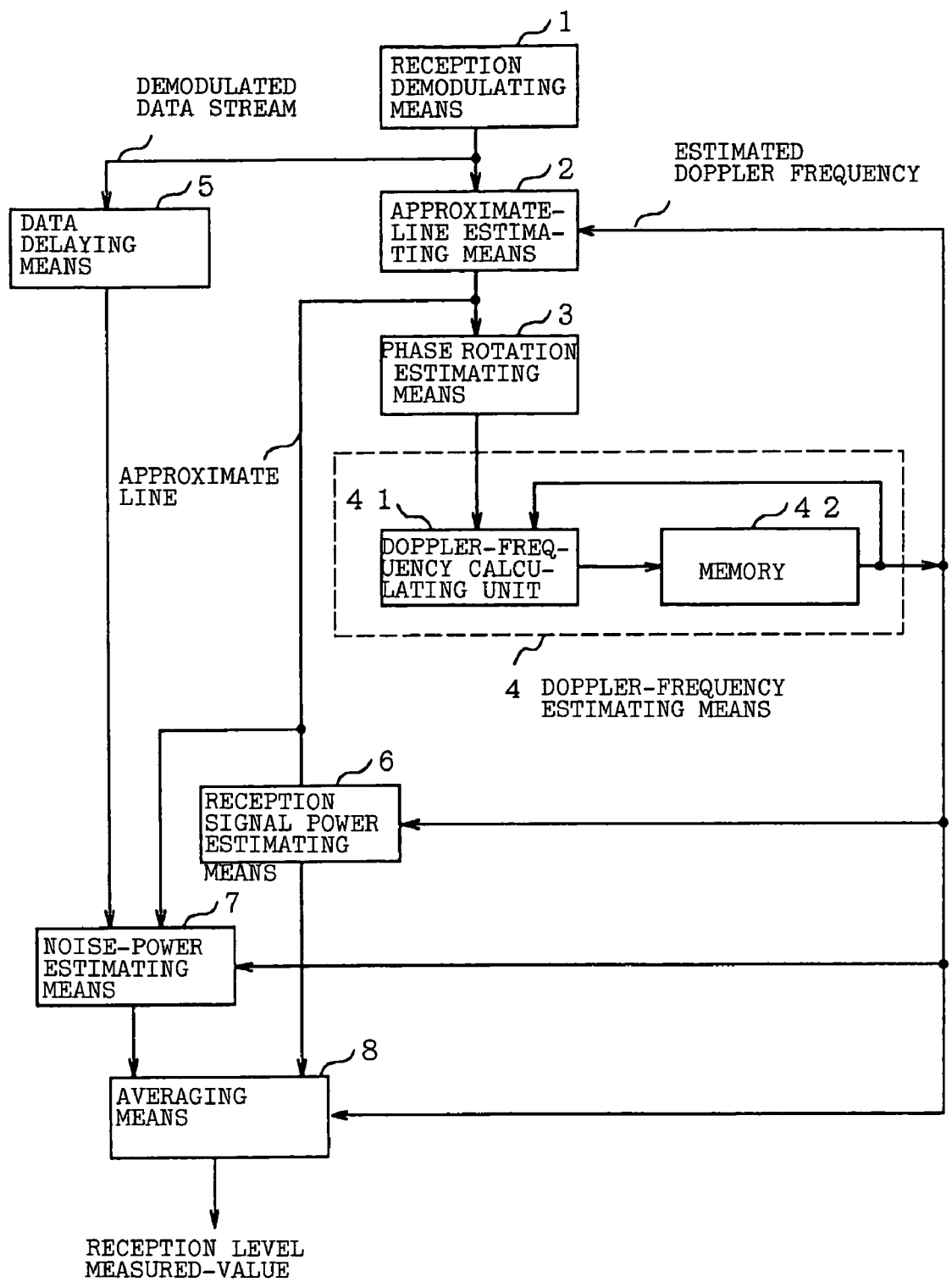
FIG. 1 is a block diagram showing a first embodiment of the present invention.

Hereinbelow, a first embodiment of the present invention will be described with reference to FIG. 1. FIG. 1 is a block diagram showing the first embodiment of the present invention.

According to the first embodiment, a reception level measuring system comprises reception demodulating means 1 for demodulating a reception signal and outputting a demodulated data stream of I- and Q-channels, approximate-line estimating means 2 for linearly approximating signal amplitudes of the demodulated data stream in a time interval set in accordance with an estimated Doppler frequency, phase-rotation estimating means 3 for estimating the amount of phase rotation based on the approximate line, Doppler-frequency estimating means 4 for estimating a Doppler frequency based on the estimated amount of phase rotation, data delaying means 5 for delaying the demodulated data stream by time necessary for the process for estimating the approximate line by the approximate-line estimating means 2, reception signal power estimating means 6 for estimating the reception signal power based on the approximate line estimated by the approximate-line estimating means 2, noise-power estimating means 7 for determining the difference in signal amplitude between the approximate line and the demodulated data stream delayed by the data delaying means 5 and estimating a noise power, and averaging means 8 for obtaining the reception level measured-value every time slot based on power values which are estimated by the reception signal power estimating means 6 and the noise-power estimating means 7.

The reception demodulating means 1 removes a carrier component from the reception signal received through an antenna from a mobile station, extracts signal components having a spread band, inversely spreads the extracted signal components by using spread codes which are assigned in advance to the mobile station, and outputs the demodulated data stream in the I- and Q-channels from the mobile stations.

The approximate-line estimating means 2 estimates, as an approximate line, the change in the signal amplitudes, caused by fading, of the demodulated data stream in the I- and Q-channels. In this case, the approximate line is estimated in a time interval set in accordance with the estimated Doppler frequencies, by the well-known method of least squares.

Figure 3A:
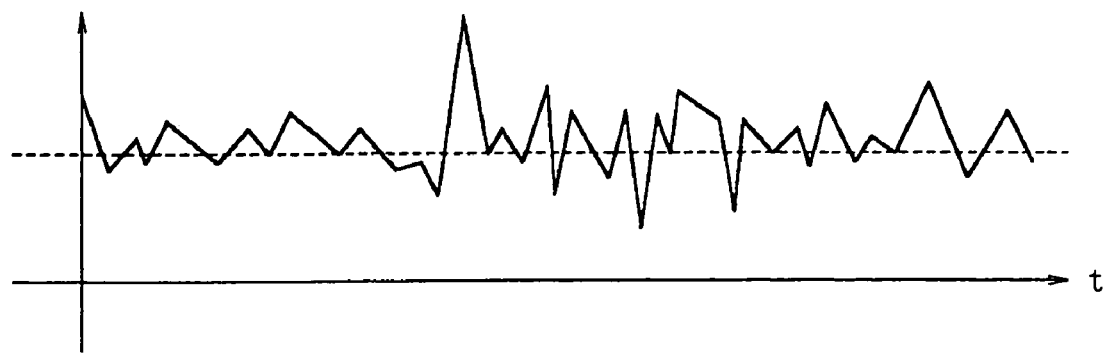
FIG. 3(a) and FIG. 3(b) are diagrams showing the relationship between the signal amplitude of a demodulated data stream and an approximate line thereof.
Figure 3B:
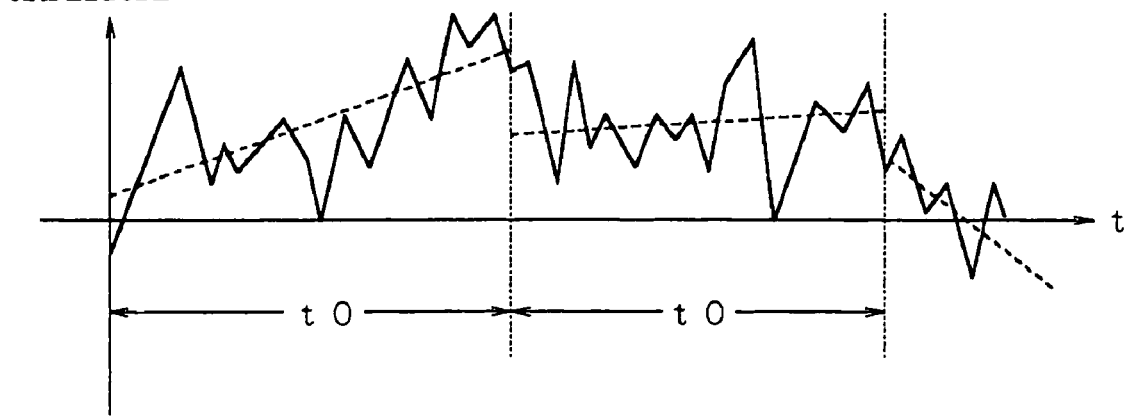

FIG. 3(a) and FIG. 3(b) are diagrams showing the relationship between the signal amplitude of the demodulated data stream and the approximate line thereof. Then, since the processing of the demodulated data stream in the I-channel is the same as the processing of the demodulated data stream in the Q-channel, only one of the I- and Q-channels (e.g., the I-channel) is shown herein.

FIG. 3(a) shows that there is no fading or only gentle fading. In this status, when it is assumed that a frequency offset is completely removed by AFC (automatic frequency correction), the phase fading can almost be ignored. Hence, the approximate line can be estimated at all sampling points for one time slot.

FIG. 3(b) shows that there is rapid fading. Herein, reference numeral t0 denotes a time interval for estimating the approximate line which is determined by the estimated Doppler frequency. The approximate-line estimating time interval t0 is shorter than the length of one time slot and the fading period, and has a predetermined signal amplitude changing ratio and a predetermined phase-fading ratio. Therefore, the approximate line is estimated every time interval t0, in order to accurately estimate the approximate line.

The phase-rotation estimating means 3 calculates the amount of phase rotation of the signal amplitudes in the I- and Q-channels based on gradient of the approximate line which is estimated by the approximate-line estimating means 2 every time interval t0.

When it is assumed that a symbol m denotes the difference in signal amplitude between a start point and an end point of the approximate line of the demodulated data stream in the I-channel and a symbol n denotes the difference in signal amplitude between a start point and an end point of the approximate line of the demodulated data stream in the Q-channel, the amount of phase rotation θ at the time interval t0 is approximated by the following expression (1).

$$\theta = arc\tan(n/m) \quad (1)$$

The Doppler-frequency estimating means 4 comprises a Doppler-frequency calculating unit 41 and a memory 42.

The Doppler-frequency calculating unit 41 calculates the amount of rotation per unit time, from the amount of phase rotation θ estimated by the phase-rotation estimating means 3. Incidentally, it is assumed that the calculated value is the current estimated Doppler frequency. The average of the present estimated Doppler frequency and the previous estimated Doppler frequency stored in the memory 42 represents a next estimated Doppler frequency. The previous estimated Doppler frequency stored in the memory 42 is updated with the next estimated Doppler frequency. It is possible to reduce the variation in the estimated values, which is caused by thermal noise and an estimation error of the approximate line, by averaging the previous estimated Doppler frequency and the present estimated Doppler frequency.

The data delaying means 5 delays the demodulated data stream by time necessary for the approximate-line estimating process of the approximate-line estimating means 2. That is, the demodulated data stream, which is synchronized with the output of the approximate-line estimating means 2, is outputted to the noise-power estimating means 7.

The reception signal power estimating means 6 estimates the reception level based on the approximate line estimated by the approximate-line estimating means 2 and the estimated Doppler frequency estimated by the Doppler-frequency estimating means 4. If the estimated Doppler frequency is low (change in level is small), the reception signal power estimating means 6 obtains the average signal amplitude within the time slot, and estimates the reception signal power. If the estimated Doppler frequency is high (change in level is large), the reception signal power estimating means 6 assumes the approximate line estimated every time interval t0 to be the present signal amplitude, obtains the average at the sampling points within the time interval t0, and estimates the reception signal power.

Since the approximate line estimated by the approximate-line estimating means 2 includes a noise component, the reception level estimated based on the approximate line also includes noise power. Thus, the noise-power estimating means 7 is provided to estimate the noise power.

The noise-power estimating means 7 determines the difference between the approximate line estimated by the approximate-line estimating means 2 and the demodulated data stream delayed by the data delaying means 5 as a noise component, and estimates the noise power based on the estimated Doppler frequency, similarly to the reception signal power estimating means 6.

The averaging means 8 subtracts the noise power level estimated by the noise-power estimating means 7 from the reception signal power level estimated by the reception signal power estimating means 61, and averages the power levels within one time slot. The averaging means 8 outputs the averaged power level as the reception level measured-value with high accuracy.

As mentioned above, the signal levels of the demodulated data stream are linearly approximated in the time interval set based on the estimated Doppler frequency which is varied in accordance with the fading. It is possible to obtain the reception level measured-value with high accuracy by estimating the reception signal power and the noise power and by measuring the reception level based on the approximate line even if the Doppler frequency is increased and the variation in phase is large.

Figure 2:
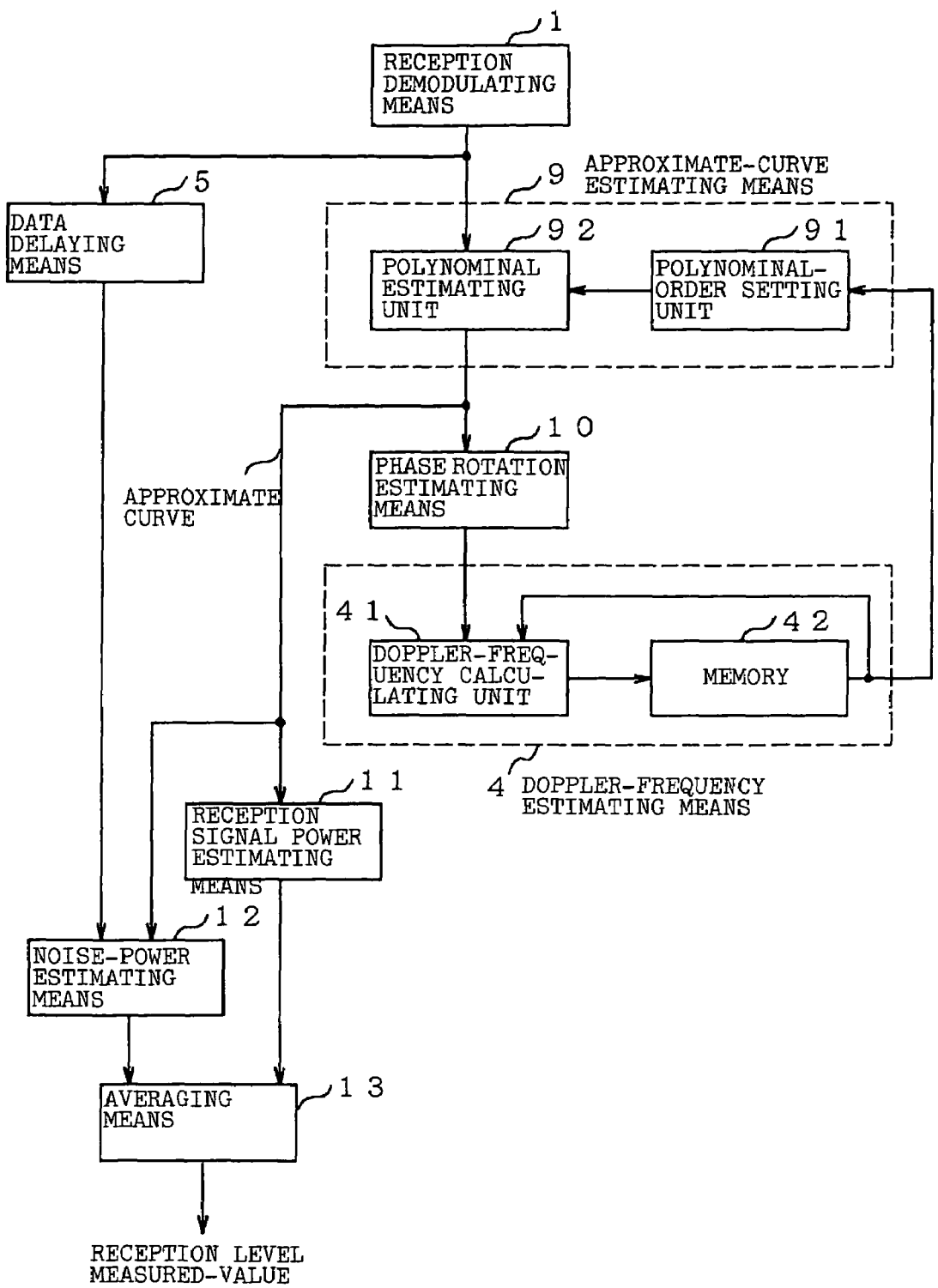
FIG. 2 is a block diagram showing a second embodiment of the present invention.

Next, a second embodiment of the present invention will be described with reference to FIG. 2. FIG. 2 is a block diagram showing the second embodiment of the present invention.

The reception demodulating means 1, the Doppler-frequency estimating means 4, and the data delaying means 5 are designated by the same reference numerals because they are the same as those in FIG. 1.

According to the second embodiment shown in FIG. 2, differently from the first embodiment shown in FIG. 1, (1) the signal amplitudes of the demodulated data stream are approximated not by a line but by a curve, (2) when the approximate curve is estimated, the approximate curve is estimated from all signal values within one time slot, instead of setting the time interval depending on the estimated Doppler frequency, and (3) the amount of phase rotation is calculated based an differential values of the approximate curve. Other features of the second embodiment are similar to those of the first embodiment.

As shown in FIG. 2, according to the second embodiment, the reception level measuring system comprises the reception demodulating means 1 for demodulating a reception signal and outputting a demodulated data stream of I- and Q-channels, approximate-curve estimating means 9 for curvedly approximate signal levels of the demodulated data stream, phase-rotation estimating means 10 for calculating the amount of phase rotation based on a differential coefficient of the approximate curve, the Doppler-frequency estimating means 4 for estimating a Doppler frequency based on the estimated amount of phase rotation, the data delaying means 5 for delaying the demodulated data stream by time necessary for the approximate curve estimating process by the approximate-curve estimating means 9, reception signal power estimating means 11 for estimating reception signal power based on the approximate curve estimated by the approximate-curve estimating means 10, noise-power estimating means 12 for determining the difference in signal amplitude between the approximate curve and the demodulated data stream delayed by the data delaying means 5 and estimating noise power, and averaging means 13 for obtaining a reception level measured-value per time slot based on the power values estimated by the reception signal power estimating means 11 and the noise-power estimating means 12.

The approximate-curve estimating means 9 comprises a polynomial-degree setting unit 91 for setting a degree N of a polynomial representing the approximate curve in accordance with an estimated Doppler frequency, and a polynomial estimating unit 92 for estimating an N-degree polynomial which approximates signal amplitude levels of the demodulated data stream of the I- and Q-channels, which are outputted from the reception demodulating means 1.

Figure 4:
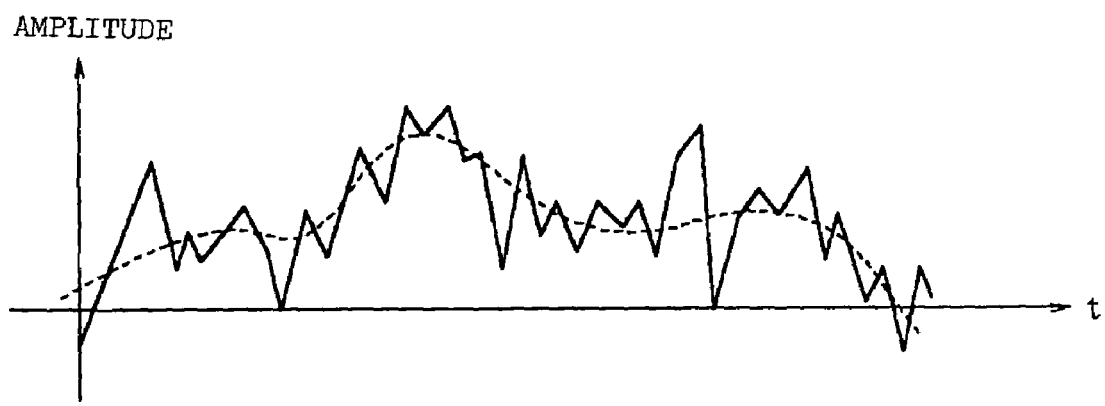
FIG. 4 is a diagram showing the relationship between the signal amplitude of a demodulated data stream and an approximate curve thereof.
Figure 5:
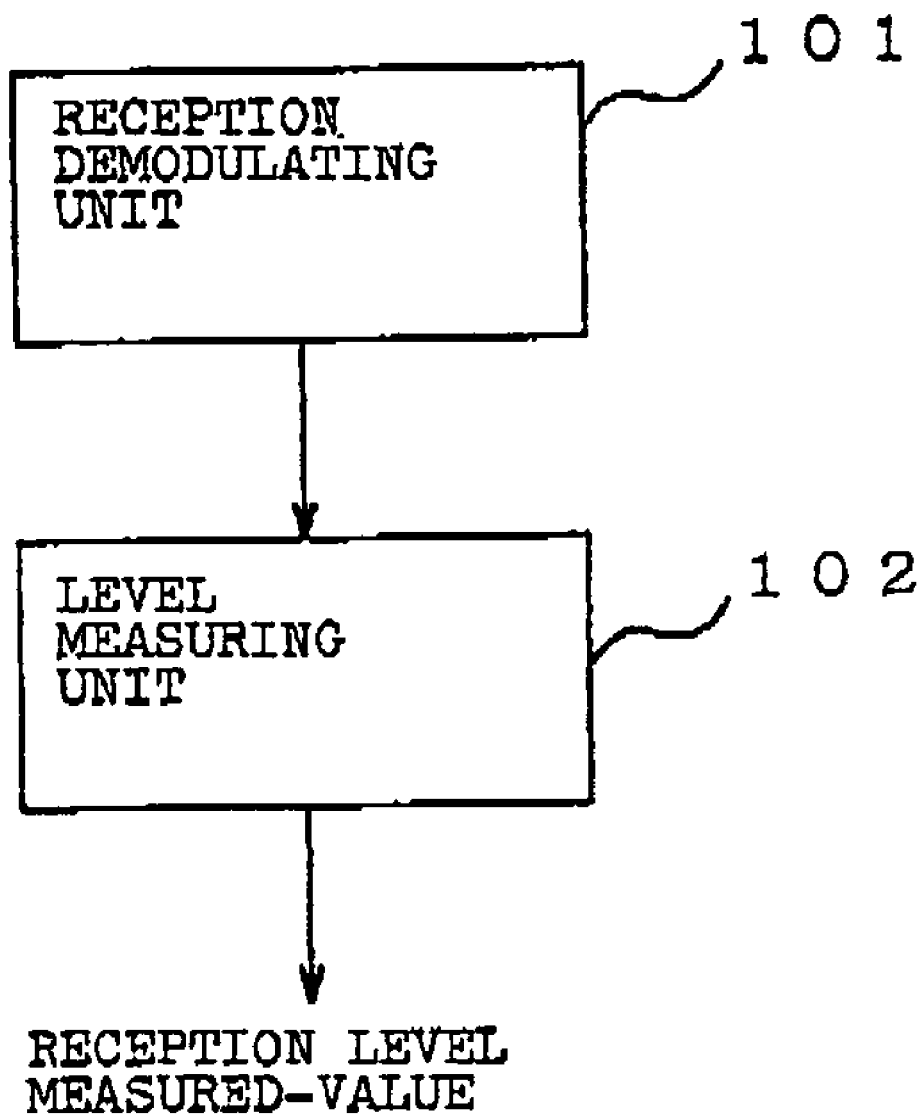
FIG. 5 is a block diagram showing the conventional art.

FIG. 4 is a diagram showing the relationship between the signal amplitudes of the demodulated data stream and the approximate curve thereof.

The polynomial-degree setting unit 91 sets the degree N of the N-degree polynomial for approximating the signal amplitudes of the demodulated data stream in accordance with the estimated Doppler frequencies. In the case of no fading or the gentle (static) fading, the degree N is equal to 1. In the case of the rapid (dynamic) fading, the degree N is set to be a higher value ($N \geq 2$) in accordance with the estimated Doppler frequency.

The phase-rotation estimating means 10 calculates the amount of phase rotation based on a maximum value of the differential coefficient of the estimated approximate-curve (N-degree polynomial). When, at a time interval t in the approximate curve, a symbol m denotes the maximum value of the differential coefficient of the I-channel and a symbol n denotes a minimum value of the differential of the Q-channel, the amount of phase rotation θ is approximated by the following expression (2).

$$\theta(t) = arc\ \tan(n/m) \qquad (2)$$

A Doppler-frequency calculating unit 41 in the Doppler-frequency estimating means 4 calculates the present Doppler frequency based on the amount of phase rotation obtained by the phase-rotation estimating means 10. Incidentally, it is assumed that a next estimated Doppler frequency is represented by the average of the present Doppler frequency as calculated above and the previous estimated Doppler frequency stored in the memory 42.

The data delaying means 5 outputs the demodulated data stream, which is synchronized with an output of the approximate-curve estimating means 9, to the noise-power estimating means 12.

The reception signal power estimating means 11 assumes the approximate curve estimated by the approximate-curve estimating means 9 to be the present signal amplitude, obtains the average at all sampling points within the time slot, and estimates the reception signal power.

The noise-power estimating means 12 determines that the noise component is the difference between the approximate curve estimated by the approximate-curve estimating means 9 and the demodulated data stream delayed by the data delaying means 5, obtains the average at all sampling points within time slot and estimates noise power, similarly to the case of the reception signal power estimating means 11.

The averaging means 13 subtracts a noise power level which is estimated by the noise-power estimating means 12, from the reception signal power level estimated by the reception signal power estimating means 11, and outputs the reception level measured-value per time slot.

As mentioned above, the curve of the signal amplitudes of the demodulated data stream is approximated by a polynomial whose order is set in accordance with the estimated Doppler frequency, estimates the reception signal power and the noise power based on the approximate curve to measures the reception level. Thus, if the Doppler frequency is high and the variation in phases is increased, the reception level can be measured at high accuracy.

INDUSTRIAL APPLICABILITY

According to the present invention, signal amplitudes of a demodulated data stream are linearly approximated in a time interval which is set in accordance with an estimated Doppler frequency that varies depending on fading, and measures a reception level based on the approximate line. As a consequence, if the Doppler frequency is high and the variation in phase is increased, the reception level can be measured with high accuracy.

Furthermore, according to the present invention, a curve of signal levels of the demodulated data stream is approximated by a polynomial whose order is set in accordance with the estimated Doppler frequency, and the reception level is measured based on the approximate curve. As a consequence, if the Doppler frequency is high and the variation in phase is increased, the reception level can be measured with high accuracy.

What is claimed is:

1. A reception level measuring system in which a base station in a code division multiple access (CDMA) mobile communication system measures a reception level of a signal from a mobile station, said reception level measuring system comprising:
    approximate-line estimating means for providing an approximate line by linearly approximating signal amplitudes of a demodulated data stream in I- and Q-channels from a reception signal, in a time interval which is set in accordance with an estimated Doppler frequency;
    phase-rotation estimating means for estimating an amount of phase rotation based on a gradient of said approximate line;
    Doppler-frequency estimating means for estimating said estimated Doppler frequency based on the amount of phase rotation; and
    reception signal power estimating means for estimating a reception signal power based on said approximate line.

2. A reception level measuring system according to claim 1, further comprising:
    data delaying means for delaying the demodulated data stream by a time necessary for an approximate line estimating process by said approximate-line estimating means; and
    noise-power estimating means for determining a difference between said approximate line and the demodulated data stream delayed by said data delaying means as a noise component and for estimating a noise power.

3. A reception level measuring system according to claim 2, further comprising:
    means for subtracting the estimated noise power estimated by said noise-power estimating means from the estimated reception signal power from said reception signal power estimating means, averaging resultant values, and outputting an average as a reception level measured-value.

4. A reception level measuring system in which a base station in a code division multiple access (CDMA) mobile communication system measures a reception level of a signal from a mobile station, said reception level measuring system comprising:
    approximate-curve estimating means for providing an approximate curve by nonlinearly approximating signal amplitudes of a demodulated data stream in I- and Q-channels from a reception signal;
    phase-rotation estimating means for estimating an amount of phase rotation based on a differential coefficient of said approximate curve;
    Doppler-frequency estimating means for estimating a estimated Doppler frequency based on the amount of phase rotation;
    reception signal power estimating means for estimating a reception signal power based on said approximate curve;
    data delaying means for delaying the demodulated data stream by a time necessary for the approximate-curve estimating process of said approximate-curve estimating means;
    noise-power estimating means for determining that a noise component is the difference between the approximate curve and the demodulated data stream delayed by said data delaying means and for estimating a noise power; and
    means for subtracting the estimated noise power estimated by said noise-power estimating means from the reception signal power from said reception signal power estimating means, averaging resultant values, and outputting an average as a reception level measured-value.

5. A reception level measuring system according to claim 4, wherein said approximate-curve estimating means approximates the signal amplitudes of the demodulated data stream by a curve represented by a polynomial whose order is set in accordance with the estimated Doppler frequency.

* * * * *